(12) United States Patent
Liu

(10) Patent No.: US 11,301,986 B2
(45) Date of Patent: Apr. 12, 2022

(54) METHOD AND APPARATUS FOR MONITORING PLANT HEALTH STATE

(71) Applicant: Guangzhou Xaircraft Technology Co., LTD, Guangzhou (CN)

(72) Inventor: Bo Liu, Guangzhou (CN)

(73) Assignee: GUANGZHOU XAIRCRAFT TECHNOLOGY CO., LTD, Guangzhou (CN)

( * ) Notice: Subject to any disclaimer, the term of this patent is extended or adjusted under 35 U.S.C. 154(b) by 386 days.

(21) Appl. No.: 16/617,057

(22) PCT Filed: Aug. 15, 2018

(86) PCT No.: PCT/CN2018/100606
§ 371 (c)(1),
(2) Date: Nov. 26, 2019

(87) PCT Pub. No.: WO2019/034070
PCT Pub. Date: Feb. 21, 2019

(65) Prior Publication Data
US 2021/0133945 A1    May 6, 2021

(30) Foreign Application Priority Data
Aug. 18, 2017 (CN) .................. 201710711878.X

(51) Int. Cl.
*G06T 7/00* (2017.01)
*A01G 7/06* (2006.01)
(Continued)

(52) U.S. Cl.
CPC .............. *G06T 7/001* (2013.01); *A01G 7/06* (2013.01); *G01N 21/314* (2013.01); *G01N 21/84* (2013.01);
(Continued)

(58) Field of Classification Search
CPC .......... G06T 7/001; G06T 2207/20081; G06T 2207/20084; G06T 2207/30188;
(Continued)

(56) References Cited

U.S. PATENT DOCUMENTS 9,336,584 B2    5/2016  Ulman
2017/0286772 A1*  10/2017 Workman .............. G06V 20/10
2018/0197287 A1*   7/2018 Macias .................. A01G 22/00

FOREIGN PATENT DOCUMENTS

CN        1945319 A    4/2007
CN      100575949 C   12/2009
(Continued)

OTHER PUBLICATIONS

International Search Report for corresponding application PCT/CN2018/100606 filed Aug. 15, 2018; dated Nov. 14, 2018.

*Primary Examiner* — Allen C Wong
(74) *Attorney, Agent, or Firm* — Cantor Colburn LLP

(57) ABSTRACT

A method for monitoring a plant health state relates to the technical field of intelligent agriculture. The method is used for intelligently determining the plant health state and timely prompting farmland managers to perform control for at least one plant in a poor plant health state. The method for monitoring the plant health state includes: performing first determination according to plant health state information; when a determination result is that there is a risk of poor plant health, performing second determination according to second plant health state information in an orientation where at least one plant at risk of poor plant health is located, so as to accurately obtain plant health state information, such that farmland managers can learn the current situation of the plant in a field timely and perform control timely. An apparatus applying the method for monitoring the plant health state is provided. The apparatus is used for monitoring the plant health state.

20 Claims, 5 Drawing Sheets

(51) Int. Cl.
*G01N 21/31* (2006.01)
*G01N 21/84* (2006.01)
*H04N 5/232* (2006.01)

(52) U.S. Cl.
CPC . *H04N 5/23296* (2013.01); *G01N 2021/3155* (2013.01); *G01N 2021/8466* (2013.01); *G01N 2201/1296* (2013.01); *G06T 2207/20081* (2013.01); *G06T 2207/20084* (2013.01); *G06T 2207/30188* (2013.01)

(58) Field of Classification Search
CPC ........ A01G 7/06; G01N 21/314; G01N 21/84; G01N 2021/3155; G01N 2021/8466; G01N 2201/1296; H04N 5/23296
USPC .......................................................... 348/143
See application file for complete search history.

(56) References Cited

FOREIGN PATENT DOCUMENTS

| | | | |
|---|---|---|---|
| CN | 102348976 | A | 2/2012 |
| CN | 104023520 | A | 9/2012 |
| CN | 103439265 | A | 12/2013 |
| CN | 104266982 | A | 9/2014 |
| CN | 104850836 | A | 8/2015 |
| CN | 105302872 | A | 2/2016 |
| CN | 106097340 | A | 11/2016 |
| CN | 106530256 | A | 3/2017 |
| CN | 106596412 | A | 4/2017 |

* cited by examiner

METHOD AND APPARATUS FOR MONITORING PLANT HEALTH STATE

TECHNICAL FIELD

The present disclosure relates to the technical field of intelligent agriculture, and in particular to a method and apparatus for monitoring a plant health state.

BACKGROUND

In traditional farmland management, farmland managers regularly observe a plant growth status in a field, and determine a plant health state according to the plant growth status. Based on experience knowledge, it is determined whether it is necessary to handle a problem of poor plant health state in the case of poor plant health.

However, the traditional farmland management requires farmland managers to regularly observe the plant growth status in the field to determine the plant health state according to the plant growth status. It is limited by time and space, and there is a risk of non-timely discovery or missing, so that the best time to take plant protection measures is missed.

SUMMARY

At least some embodiments of the present disclosure provide a method and apparatus for monitoring a plant health state, so as at least to intelligently determine the plant health state and timely prompt farmland managers to perform control for plants in a poor plant health state in the case of poor plant health.

In an embodiment of the present disclosure, a method for monitoring a plant health state is provided. The method for monitoring a plant health state may include that:

first plant health state information provided by a plant health state measuring device is received, and a plant health state is determined according to the first plant health state information to obtain first determination information;

when the content indicated by the first determination information is a risk of poor plant health, second plant health state information in an orientation where at least one plant at risk of poor plant health is located is received, and the plant health state is determined according to the second plant health state information to obtain second determination information; and when the content indicated by the second determination information is poor plant health, it is confirmed that the plant health state is poor, and orientation information of the at least one plant in poor health is determined.

In one of the embodiments of the present disclosure, an apparatus for monitoring a plant health state is also provided. The apparatus for monitoring the plant health state may include:

a receiving element, configured to receive first plant health state information provided by a plant health state measuring device; and a processing element, connected with the receiving element, and configured to perform first determination on a plant health state according to the first plant health state information to obtain first determination information; the receiving element is further configured to receive, when the content indicated by the first determination information is a risk of poor plant health, second plant health state information in an orientation where at least one plant at risk of poor plant health is located, perform second determination on the plant health state according to the second plant health state information to obtain second determination information, and when the content indicated by the second determination information is poor plant health, confirm that the plant health is poor and determine orientation information of the at least one plant in poor health.

Compared with the related art, the method and apparatus for monitoring the plant health state provided by at least some embodiments of the present disclosure have the advantages that first determination information is obtained by performing first determination on first plant health state information provided by the plant health state measuring device, when the content indicated by the first determination information is a risk of poor plant health, second plant health state information in an orientation where at least one plant at risk of poor plant health is located is received to perform second determination on the second plant health state information, so that during the second determination, it can be determined that the at least one plant is in poor health, and orientation information of the at least one plant in poor health can be determined. Thus, farmland managers are not limited by time and space, and can timely understand the health state of at least one plant in a field, so that when the at least one plant is in poor health, the position of the at least one plant in poor health can be quickly determined according to the orientation information of the at least one plant in poor health, thereby taking plant protection measures as soon as possible to restore the health of the plant.

BRIEF DESCRIPTION OF THE DRAWINGS

The accompanying drawings described herein are used to provide a further understanding of the present disclosure and constitute a part of the present disclosure, and the exemplary embodiments of the present disclosure and the description thereof are used for explaining the present disclosure, but do not constitute improper limitations to the present disclosure. In the drawings.

DETAILED DESCRIPTION

The technical solutions in the embodiments of the present disclosure will be clearly and completely described below with reference to the drawings in the embodiments of the present disclosure. It is apparent that the described embodiments are a part of the embodiments of the present disclosure, not all of the embodiments. All other embodiments obtained by those of ordinary skill in the art based on the embodiments in the present disclosure without creative work shall fall within the scope of protection of the present disclosure.

Figure 2:
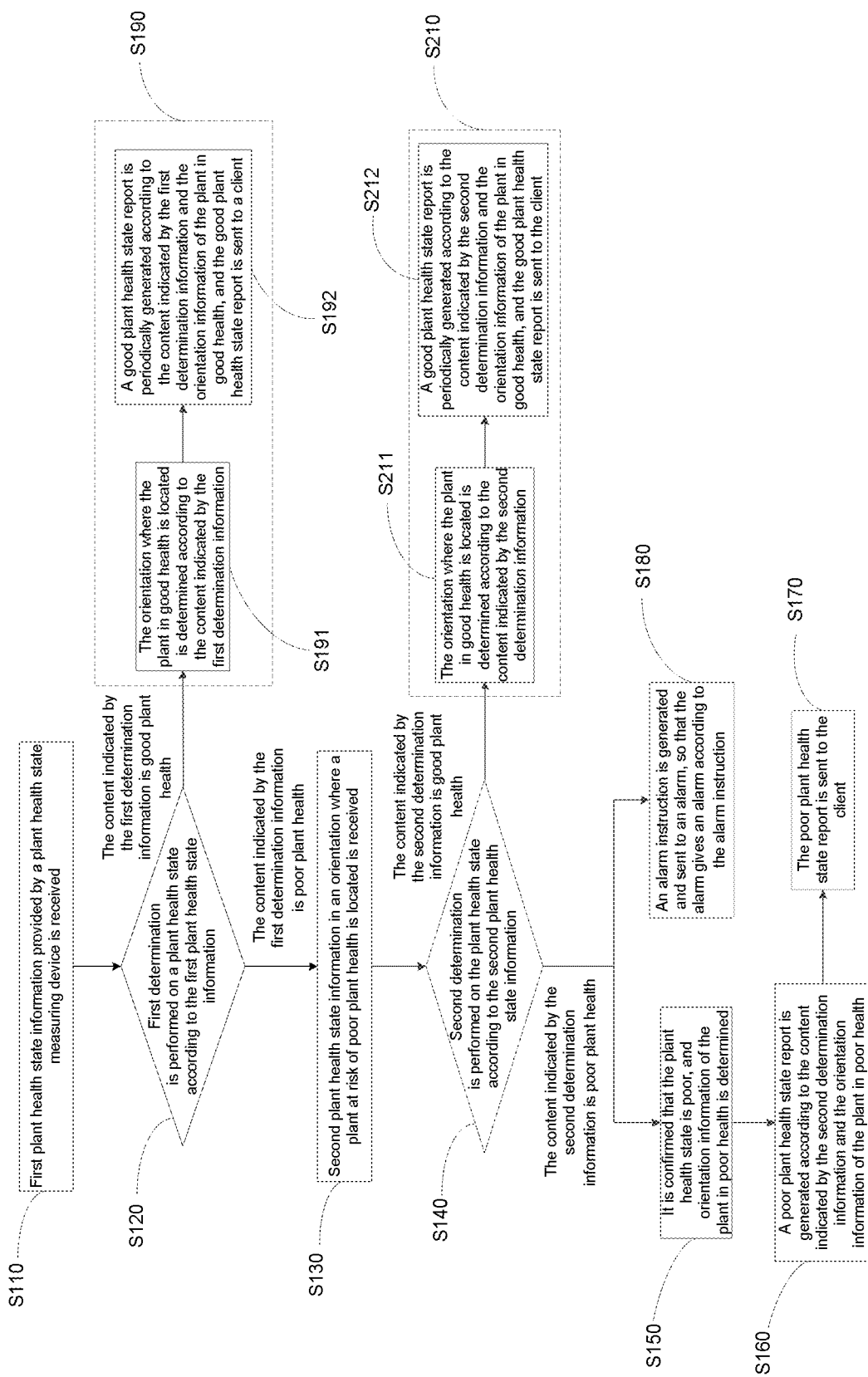
FIG. 2 is a flowchart of a method for monitoring a plant health state according to an embodiment of the present disclosure.
Figure 6:
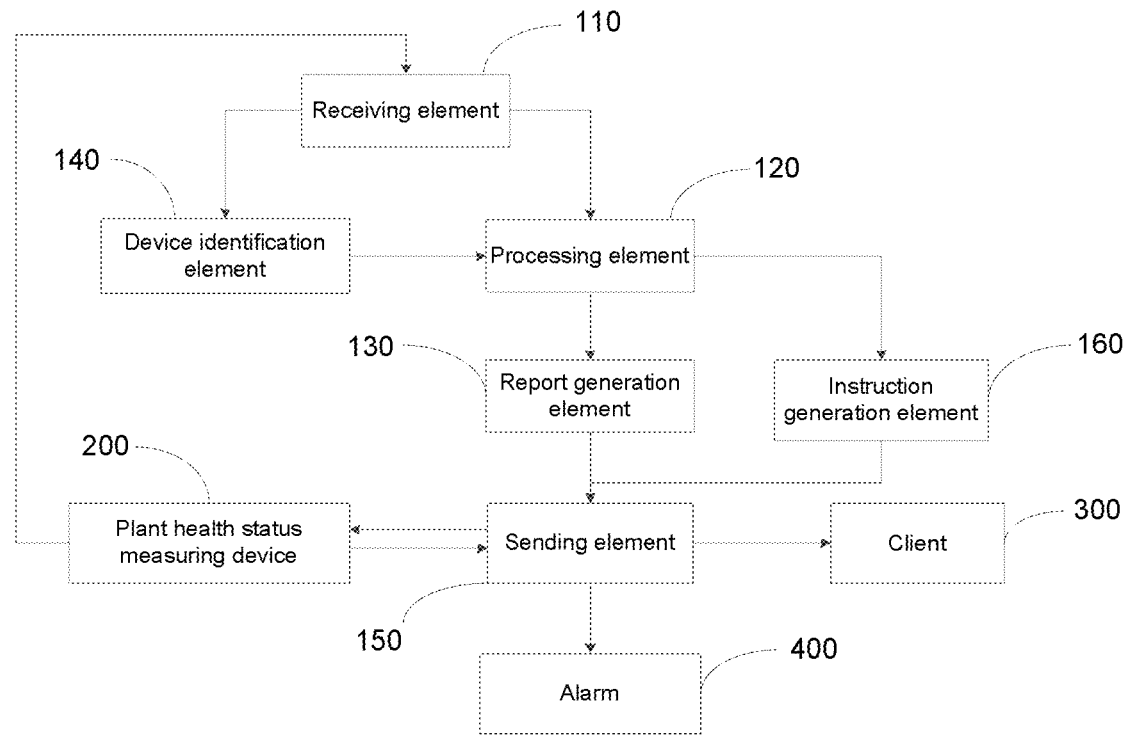
FIG. 6 is a structural block diagram of an apparatus for monitoring a plant health state according to an embodiment of the present disclosure.
Figure 8:
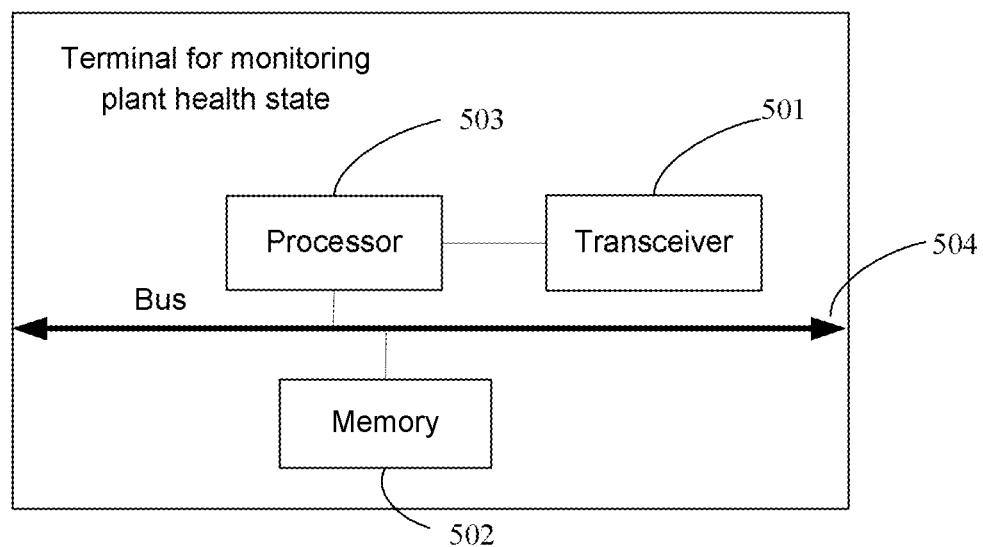
FIG. 8 is a hardware structure diagram of a terminal for monitoring a plant health state according to an embodiment of the present disclosure.

As shown in FIG. 2, FIG. 6 and FIG. 8, at least some embodiments of the present disclosure provide a method and apparatus for monitoring a plant health state. An orientation where at least one plant at risk of poor plant health is located may be determined, higher-precision plant image information is received and analyzed to finally determine the plant health state, and farmland managers are timely prompted to perform control in the case of poor plant health, so that the problem of missing of the best time to take plant protection measures due to the risk of non-timely discovery or missing caused by time and space limitation of traditional farmland management is overcome.

Figure 1:
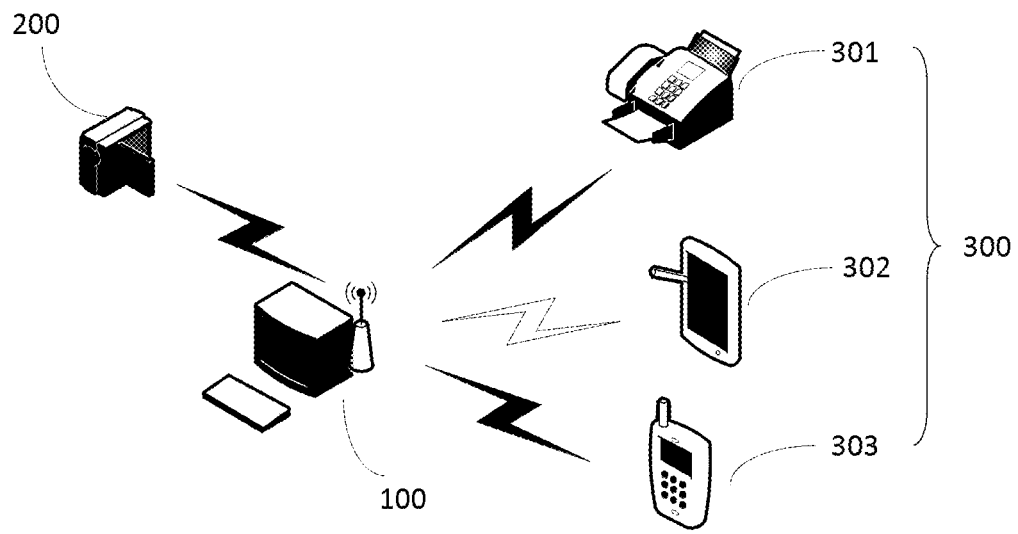
FIG. 1 is a schematic diagram of an application environment of a method for monitoring a plant health state according to an embodiment of the present disclosure.

As shown in FIG. 1, the technical solution provided by the embodiment of the present disclosure is implemented by a terminal device 100 and wirelessly or wiredly communicates with a plant health state measuring device 200 to receive information provided by the plant health state measuring device 200. The terminal device 100 processes the information provided by the plant health state measuring device 200, and sends the result to a client 300 in the form of a report. The client 300 may be an application client carried by a fax machine 301, a tablet computer 302, and a mobile phone 303, and the application client includes an SMS client, a WeChat client, a mail client, etc.

As shown in FIG. 2, the method for monitoring a plant health state according to an embodiment of the present disclosure includes the following steps.

At step S110, first plant health state information provided by a plant health status measuring device 200 is received.

At step S120, first determination is performed on a plant health state according to the first plant health state information to obtain first determination information, and when the content indicated by the first determination information is a risk of poor plant health, step S130 is performed.

At step S130, second plant health state information provided by the plant health state measuring device 200 in an orientation where at least one plant at risk of poor plant health is located is received.

At step S140, second determination is performed on the plant health state according to the second plant health state information to obtain second determination information.

At step S150, when the content indicated by the second determination information is poor plant health, it is confirmed that the plant health state is poor, and orientation information of the at least one plant in poor health is determined.

It can be known that the poor plant health state is a relatively certain state. That is, the probability of such poor health is higher than the ordinary probability, and it is defined as the poor plant health state.

Based on the above working process, it can be seen that according to the method for monitoring the plant health state provided by an embodiment of the present disclosure, first determination information is obtained by performing first determination on first plant health state information provided by a health state measuring device. When the content indicated by the first determination information is a risk of poor plant health, second plant health state information in an orientation where at least one plant at risk of poor plant health is located is received to perform second determination on the second plant health state information, so that during the second determination, it can be determined that the at least one plant is in poor health, and orientation information of the at least one plant in poor health can be determined. Thus, farmland managers are not limited by time and space, and can timely understand the health state of at least one plant in a field, so that when the at least one plant is in poor health, the position of the at least one plant in poor health can be quickly determined according to the orientation information of the at least one plant in poor health, thereby taking plant protection measures as soon as possible to restore the health of the plant.

For example, traditional farmland management methods are used for managing a large area of farmland, farmland managers not only need to regularly observe the plant growth status in the field, but also need to observe the plants in each orientation and at each corner of the large area of farmland in order to accurately obtain the plant growth status, which not only brings inconvenience to farmland management, but also wastes time greatly. In the method for monitoring the plant health state provided by the embodiment of the present disclosure, not only the plant health state can be determined, but also orientation information of the plants in poor health can be determined, thereby enabling agricultural managers to provide early warning of plants in a specific orientation.

It is to be noted that the plant health state information provided by the plant health state measuring device 200, whether it is the first plant health state information or the second plant health state information, may be acquired in real time or may be periodically acquired, and the specific type of the plant health state information provided by the plant health state measuring device 200 is determined by a component included in the plant health state measuring device 200.

For example, when the plant health state information provided by the plant health state measuring device 200 includes at least plant image information, the plant health state measuring device 200 may be a monitoring device arranged in a farmland, or may be an unmanned aerial vehicle capable of taking a picture, or other devices capable of acquiring plant images. In summary, the plant health state measuring device 200 should at least include a component having an image acquisition function, such as a video camera and a camera.

When the type of the plant image information is at least one of visible spectrum image information and invisible spectrum image information, the visible spectrum image information is acquired by an ordinary video camera or camera, and the invisible spectral image information is acquired by an image acquisition device having an infrared detection function, such as an infrared camera or an infrared video camera. For the image acquisition device having the infrared detection function, it can fully exploit its advantages at night, capture information that cannot be acquired by the ordinary video camera, and acquire symptoms of cases of plants that cannot be found under visible light. Its advantages are self-evident relative to the ordinary video camera or camera.

It is to be noted that the method for monitoring the plant health state provided by the embodiment of the present disclosure can accurately determine whether the at least one plant is in poor health by at least two determinations, so as to avoid the problem in the related art that agricultural managers perform artificial experience determination in conjunction with climatic and environmental factors in a certain period of plant growth based on experiential knowledge in the case of no plant pests and early spray drugs for prevention, resulting in unreasonable pesticide spraying.

After step S150 is completed, third plant health state information of at least one plant in poor health, which is sent by the plant health state measuring device 200, may be further received according to the determined orientation information of the at least one plant in poor health, so as to further determine whether the plant is in a good health state according to the third plant health state information. By analogy, plant health state information may be repeatedly received and determined to achieve monitoring of the plant health state. The number of times to receive and determine plant health state information may be determined according to actual needs.

Specifically, when the first plant health state information includes at least current plant image information, the second plant health state information includes at least current plant image information corresponding to the orientation where the at least one plant is at risk of poor health. The accuracy of the current plant image information in the second plant health state information may be defined to be greater than the accuracy of the current plant image information in the first plant health state information (the accuracy herein may be higher-resolution plant image information). At this time, after step S150, it is determined whether the accuracy of the orientation information of the at least one plant in poor health, which is determined by the second determination, is higher than a preset accuracy.

When the accuracy of the orientation information of the at least one plant in poor health is higher than the preset accuracy, the determination is ended. Otherwise, the third plant status information of the orientation where the at least one plant in poor health is located is received and determined, and the accuracy of the third plant health state information is defined to be greater than the accuracy of the second plant health state information.

By analogy, the plant health state information is received and determined for multiple times until the accuracy of certain orientation information of at least one plant in poor health is higher than the preset accuracy, and the operation of receiving and determining plant health state information is ended.

It is to be noted that the above limitation on the number of times of receiving and determining is based on the accuracy of the orientation where the at least one plant in poor health is located. At this time, it is necessary to define the accuracy of the current plant health state information to be greater than the accuracy of the previous plant health state information. That is, the accuracy of the current plant image information in the second plant health state information is greater than the accuracy of the current plant image information in the first plant health state information.

Figure 4:
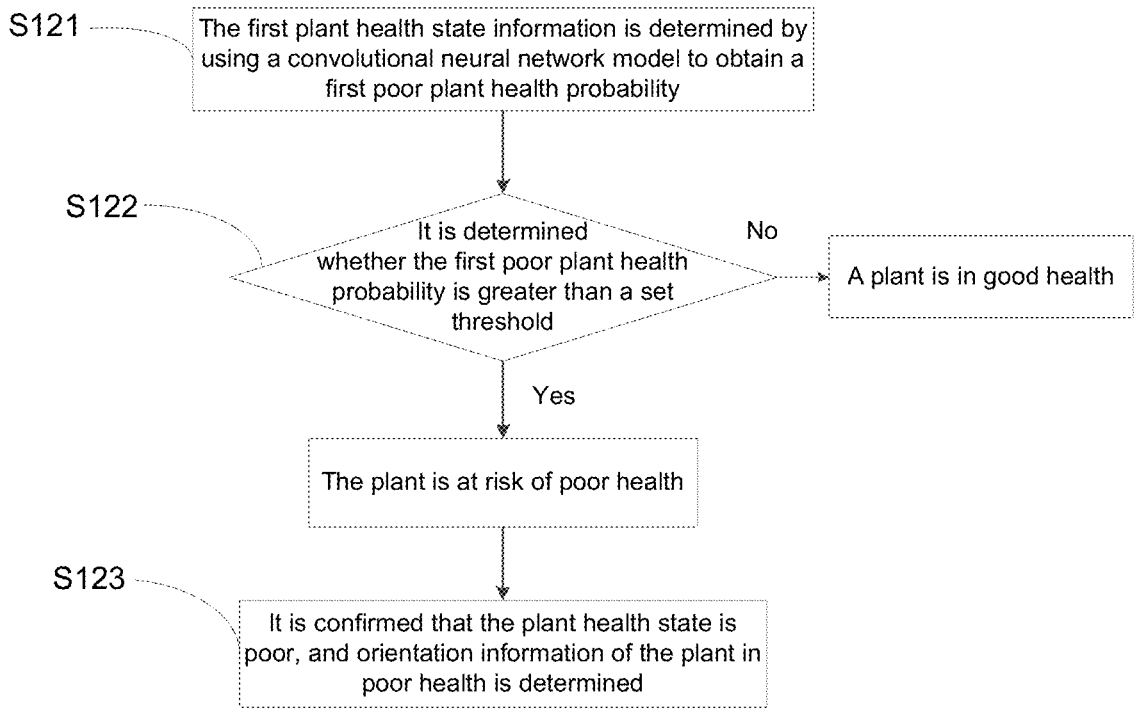
FIG. 4 is a flowchart of performing first determination on a plant health state according to first plant health state information according to an embodiment of the present disclosure.

Considering that there is various image identification and determination technologies in the related art, most of them are not highly intelligent. Based on this, as shown in FIG. 4, the operation that first determination is performed on the plant health state according to the first plant health state information to obtain first determination information includes the following steps.

At step S121, the first plant health state information is determined by using a convolutional neural network model to obtain a first poor plant health probability.

At step S122, it is determined whether the first poor plant health probability is greater than a set threshold.

When the first poor plant health probability is greater than the set threshold, it is confirmed that the at least one plant is at risk of poor health, orientation information of the at least one plant at risk of poor health is determined, and step S130 is performed, where the orientation information of the at least one plant at risk of poor health is determined according to the first plant health state information. That is, when the first plant health state information is determined by using the convolutional neural network model, the convolutional neural network model may identify the first plant health state information to obtain the orientation information of the at least one plant at risk of poor health.

Otherwise, it is determined that the plant is in good health.

The risk of poor plant health includes at least one of a risk of pest and a risk of nutrient deficiency, and the risk of nutrient deficiency includes at least one of a risk of trace element deficiency, a risk of nitrogen deficiency, a risk of phosphorus deficiency, and a risk of potassium deficiency.

Figure 5:
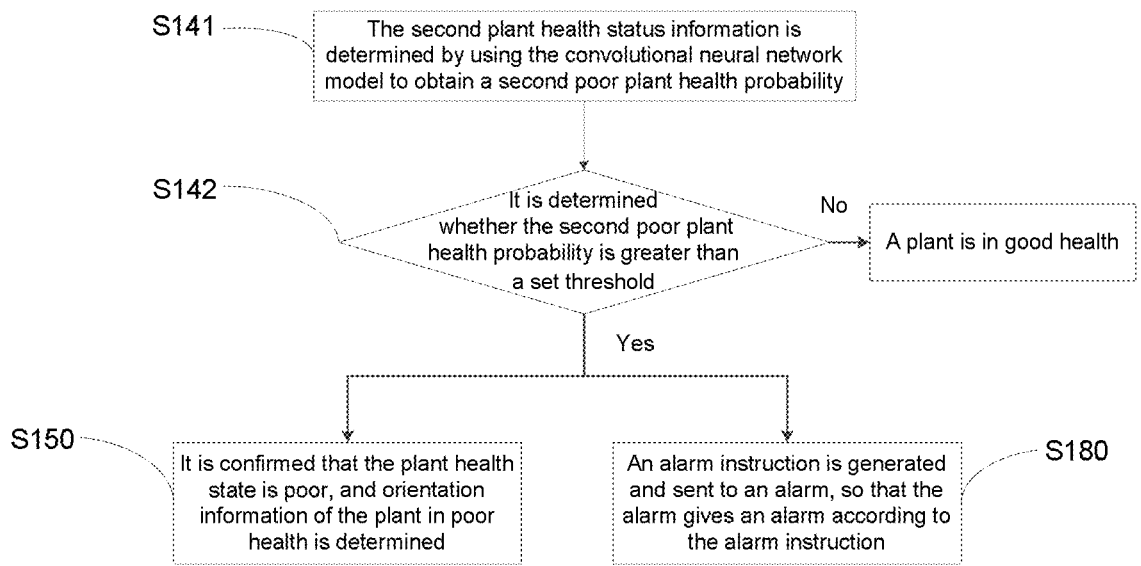
FIG. 5 is a flowchart of performing second determination on a plant health state according to second plant health state information according to an embodiment of the present disclosure.

Similarly, as shown in FIG. 5, the operation that second determination is performed on the plant health state according to the second plant health state information to obtain second determination information includes the following steps.

At step S141, the second plant health state information is determined by using the convolutional neural network model to obtain a second poor plant health probability.

At step S142, it is determined whether the second poor plant health probability is greater than a set threshold.

When the second poor plant health probability is greater than the set threshold, step S150 is performed.

Otherwise, it is determined that the plant is in good health.

At step S150, it is confirmed that the at least one plant is in poor health, and the degree of poor plant health and orientation information of the at least one plant in poor health are determined, where the degree of poor plant health may be determined according to the percentage of a difference between the second poor plant health probability and the set threshold in the set threshold. As the difference is larger, the degree of poor plant health is higher. The orientation information of the at least one plant in poor health is determined according to the second plant health state information. That is, when the second plant health state information is determined by using the convolutional neural network model, the convolutional neural network model may identify the second plant health state information to obtain the orientation information of the at least one plant in poor health.

It is to be noted that the poor plant health may include at least one of at least one plant in a symptom of pest and at least one plant in a symptom of nutrient deficiency, and the symptom of nutrient deficiency may include at least one of a symptom of trace element deficiency, a symptom of nitrogen deficiency, a symptom of phosphorus deficiency, and a symptom of potassium deficiency.

Specifically, the convolutional neural network model is obtained by learning and training. Therefore, before the first plant health state information is determined by using the convolutional neural network model, the method for monitoring the plant health state further includes the following steps.

Firstly, historical plant health state information is received, the historical plant health state information including at least historical plant image information.

Secondly, the historical plant health state information is learned and trained by using a convolutional neural network to obtain the convolutional neural network model.

In the method for monitoring the plant health state provided by the embodiment of the present disclosure, the convolutional neural network model is used for determining the plant image information, so that the parallel data processing advantages possessed by the convolutional neural network model can be utilized to improve the data processing capability. Moreover, it is also possible that the convolutional neural network model can be adjusted by the process of learning and training because the adaptive ability of the convolutional neural network model is extremely high, so that the convolutional neural network model is more accurate in data processing.

It is to be noted that the operation of determining the current plant image information in the first plant health state information by using the convolutional neural network model, or determining the current plant image information in the second plant health state information, or learning and training the historical plant image information in the historical plant health state information by using the convolutional neural network is carried out in the form of pictures.

When the plant image information is an image with a time dimension, the plant image information needs to be processed according to each frame of picture. Therefore, although the current plant image information and the historical plant image information may both be images with a time dimension, actual processing is carried out still in the form of pictures. That is, the operation of determining the current plant image information in the first plant health state information by using the convolutional neural network model, or determining the current plant image information in the second plant health state information, or learning and training the historical plant image information in the historical plant health state information by using the convolutional neural network is carried out by frame-by-frame pictures.

In order to enable the convolutional neural network model to more accurately determine the first poor plant health probability or the second poor plant health probability when determining the current plant image information, the historical plant health state information also includes at least one of historical soil information, historical air information and historical illumination information. Meanwhile, the first plant health state information includes at least at least one of current soil information, current air information and current illumination information. When using the convolutional neural network model to determine the current plant image information, the soil information, air information and illumination information of the current plant can be used as a reference to more accurately determine the first poor plant health probability or the second poor plant health probability to avoid mis-determination caused by not considering the conditions of soil, air and sunlight.

It can be understood that when the first plant health state information further includes at least at least one of current soil information, current air information and current illumination information, and the second plant health state information includes at least at least one of current soil information, current air information and current illumination information, the plant health state measuring device 200 should also include a soil information acquisition element that measures soil information, such as at least one of a soil moisture sensor, a soil temperature sensor and a soil nutrient analyzer, and may, of course, include other soil information acquisition elements that can monitor soil information.

The plant health state measuring device 200 should also include an air information acquisition element that measures air information, such as at least one of an air humidity sensor, a thermometer and an air quality detector, and may, of course, include other air information acquisition elements that can monitor air information.

The plant health state measuring device 200 should also include an illumination information acquisition element that measures illumination information, such as at least one of an illumination intensity measuring instrument and an ultraviolet intensity detector. It may also include other illumination information acquisition elements that can monitor illumination information.

It is to be noted that the historical plant health state information, the first plant health state information and the second plant health state information may include not only the above-mentioned information, but also weather information and the like, which are not limited herein.

In addition, in the above method for monitoring the plant health state, either the current plant image information involved in the first determination or the current plant image involved in the second determination may be a picture or an image with a time dimension. Both the first determination and the second determination are to identify the corresponding current plant image to identify whether the plant in the current plant image information has symptoms of pests and nutrient deficiency.

Specifically, in order to make the content of the current image information provided by the second plant health state information richer, when the content indicated by the first determination information is at least one plant at risk of poor health, before receiving second plant health state information provided by the plant health state measuring device 200 in an orientation where at least one plant at risk of poor plant health is located, between step S120 and step S130, the method for monitoring the plant health state further includes the following steps.

In the first step, an image acquisition element control instruction is generated, the image acquisition element control instruction at least includes orientation information of the at least one plant at risk of poor health and image magnification control information, and the image magnification control information includes image magnification factor control information and image magnification angle control information.

In the second step, the image acquisition element control instruction is sent to the plant health state measuring device 200, so that the plant health state measuring device 200 acquires, according to the image acquisition element control instruction, the second plant health state information of the orientation where the at least one plant at risk of poor health is located. The current plant image information included in the second plant health state information is image magnification information of different angles of the current plant image in the orientation where the at least one plant is at risk of poor health is located in the first plant health state information.

Specifically, when the image acquisition element in the plant health state measuring device 200 receives the image acquisition element control instruction, a position capable of acquiring the orientation information of the at least one plant at risk of poor health is adjusted according to the orientation information of the at least one plant at risk of poor health, an image magnification factor is adjusted according to the image magnification factor control information, and an angle, at which the plant health state information is acquired, is adjusted according to the image magnification angle control information, so as to perform magnification and acquisition on the plant in the orientation where the plant in poor health state from different angles.

For example, when the adopted image acquisition element includes an omnidirectional holder and a video camera disposed on the omnidirectional holder, the omnidirectional holder receives the orientation information of the at least one plant at risk of poor health, and may rotate horizontally and vertically by a certain angle to adjust an angle at which the video camera acquires at least one plant image, so that the angle at which the video camera acquires at least one plant image is adjusted to the orientation where the at least one plant at risk of poor health is located.

The video camera receives the image magnification factor information, and adjusts a focal length of the video camera to adjust the depth of field for acquiring a target plant, thereby acquiring a macro photograph of the target plant, that is, a magnified photograph of the plant. Therefore, the resolution of the current plant image information included in the second plant health state information is improved.

In addition, the image acquisition element may also be movable. For example, the image acquisition element is installed in an unmanned aerial vehicle or a hot air balloon. By periodically controlling the unmanned aerial vehicle to acquire plant image information, the unmanned aerial vehicle may be a quadrotor unmanned aerial vehicle or a fixed-wing unmanned aerial vehicle, etc.

Further, when the plant health state measuring device 200 is a stationary plant health state measuring device, the plant health state measuring device 200 includes an image acquisition element fixed in the field. There are at least m pieces of image magnification factor control information. There are at least n pieces of image magnification angle control information. Each of the image magnification angle control information includes device horizontal rotation angle control information and device vertical rotation angle control information. And m and n are both greater than or equal to 1. At this time, the second plant health state information acquired by the plant health state measuring device 200 should include m×n groups of plant health state data, and each group of plant health state data includes device rotation angle information, image magnification information, and current plant image information at risk of poor health. After receiving the multiple groups of plant health state data, the device rotation angle information and the image magnification information may be recorded to determine the orientation information of acquiring the corresponding group of plant health state data, so that when the content indicated by the second determination information is at least one plant in poor health, it is possible to determine the orientation information of the at least one plant in poor health according to the device rotation angle information and the image magnification information. Meanwhile, when it is necessary to perform third reception and determination, the device rotation angle information and the image magnification information received for the second time may be further refined, and all the rotation angles and magnification factors after the refinement are sent to the plant health state measuring device 200 in the form of an instruction, so that the plant health state measuring device 200 can acquire the current plant image information in a more detailed manner, thereby ensuring that the accuracy of the current plant image information acquired each time is greater than the accuracy of the current plant image information acquired previously.

When the plant health state measuring device 200 is a movable plant health state measuring device, the image acquisition element is disposed on an unmanned aerial vehicle or a hot air balloon. At this time, the image acquisition element control instruction further includes k pieces of device coordinate control information. There are at least m pieces of image magnification factor control information. There are at least n pieces of image magnification angle control information. Each of the image magnification angle control information includes device horizontal rotation angle control information and device vertical rotation angle control information. And m, n and k are all greater than or equal to 1.

Correspondingly, the second plant health state information includes m×n×k groups of plant health state data. And each group of plant health state data includes device coordinate information, device rotation angle information, image magnification information, and current plant image information at risk of poor health.

At this time, when the content indicated by the second determination information is at least one plant in poor health, not only the orientation information of the at least one plant in poor health can be determined according to the device rotation angle information and the image magnification information, and during the third determination, the device rotation angle information and the image magnification information are further refined to ensure that the accuracy of the current plant image information acquired each time is greater than the accuracy of the current plant image information acquired previously. Moreover, by refining the device coordinate information, the plant health state measuring device 200 performs image acquisition with more accurate coordinates.

In order to enable the farmland managers to fully understand the plant health state, as shown in FIG. 2, when the content indicated by the first determination information is good plant health, the method for monitoring the plant health state further includes step S190 in an alternative relationship with step S130, and includes the following steps.

At step S191, according to the content indicated by the first determination information, the orientation where the at least one plant in good health is located is determined.

At step S192, a good plant health state report is periodically generated according to the content indicated by the first determination information and the orientation information of the at least one plant in good health, and the good plant health state report is sent to a client.

When the content indicated by the second determination information is good plant health, the method for monitoring the plant health state further includes step S210, which specifically includes the following steps.

At step S211, according to the content indicated by the second determination information, the orientation where the at least one plant in good health is located is determined.

At step S212, a good plant health state report is periodically generated according to the content indicated by the second determination information and the orientation information of the at least one plant in good health, and the good plant health state report is sent to a client 300.

It can be understood that since the plant health is good, the farmland managers are not required to perform pest control operations on the plants, and therefore, a good health state report can be periodically generated and sent to the client 300.

In addition, for plants in poor health, it is necessary to perform pest control and the like in time. Based on this, after step S150, the method further includes step S160.

At step S160, a poor plant health state report is generated according to the content indicated by the second determination information and the orientation information of the at least one plant in poor health.

Further, in order to prevent the farmland managers from failing to see the poor plant health state report in time, the pest control time is missed, and when the content indicated by the second determination information is poor plant health state, as shown in FIG. 2, the method for monitoring the plant health state further includes the following steps.

At step S170, the poor plant health state report is sent to the client 300 to prompt the farmland managers to view the poor plant health state report in real time.

Meanwhile, when the content indicated by the second determination information is poor plant health, as shown in FIG. 2, the method for monitoring the plant health state further includes step S180 in parallel with step S150. Specifically, at step S180, an alarm instruction is generated and sent to an alarm 400, so that the alarm 400 gives an alarm according to the alarm instruction to further remind prompt the farmland managers.

It is to be noted that when either the good plant health state report or the poor plant health state report is sent to the client, it may be sent to a corresponding APP such as an SMS client, a WeChat client or a mail client in the form of an SMS, a WeChat message or a mail. The WeChat message may be sent to the WeChat client of the farmland managers in the form of a private message, or may be sent to various clients of various farmland managers in the form of a service push message.

Figure 3:
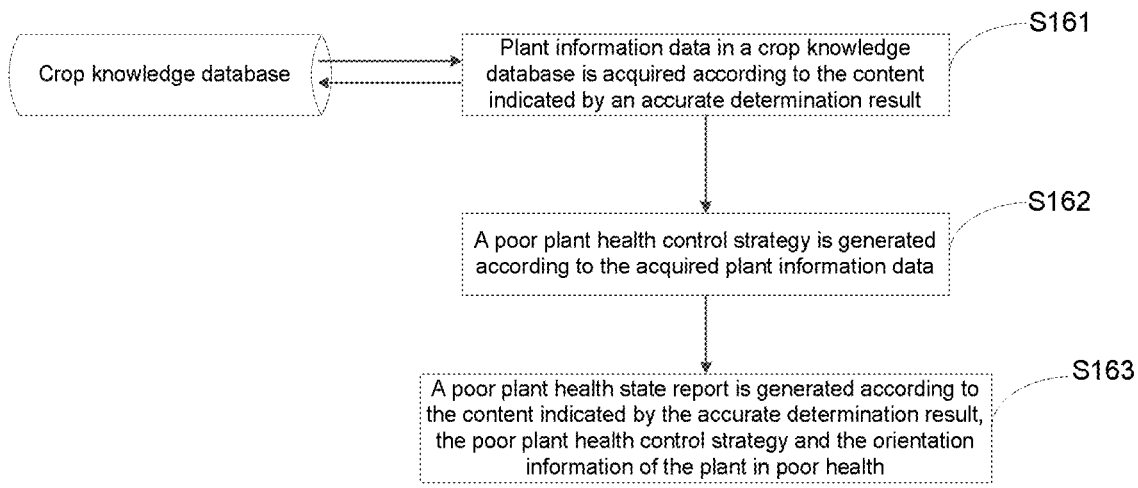
FIG. 3 is a flowchart of generating a poor plant health state report according to an embodiment of the present disclosure.

Further, in order to make the content of the poor plant health state report more comprehensive, as shown in FIG. 3, when the content indicated by the second determination information is poor plant health, the operation that a poor plant health state report is generated according to the content indicated by the second determination information and the orientation information of the at least one plant in poor health includes the following steps.

At step S161, plant information data in a crop knowledge database is acquired according to the content indicated by the second determination information.

At step S162, a poor plant health control strategy is generated according to the acquired plant information data, the crop knowledge database includes various plant information data, each of the plant information data includes plant information and a corresponding poor plant health control strategy.

It can be understood that the crop knowledge database herein may be a database that already has plant information and a corresponding poor plant health control strategy, or may acquire various plant information and poor plant health control strategies. For example, the poor plant health control strategy may include a pest control strategy for various plants and at least one plant nutrient deficiency control strategy for various plants.

At step S163, a poor plant health state report is generated according to the content indicated by the second determination information, the poor plant health control strategy and the orientation information of the at least one plant in poor health. The poor plant health state report may include a position region of a target plant, a poor plant health occurrence range, a poor plant health picture, identification time, a poor plant health control strategy, etc. Poor plant health may include not only pests, diseases and nutrient deficiency, but also other unhealthy states.

Based on the specific process of generating a poor plant health state report according to the content indicated by the second determination information and the orientation information of the at least one plant in poor health, according to the method for monitoring the plant health state provided by at least some embodiments of the present disclosure, in the process of generating the poor plant health state report, the plant information data in the crop knowledge database is acquired according to the content indicated by the second determination information. The poor plant health control strategy is given in a targeted manner. And the content indicated by the second determination information and the poor plant health control strategy are generated as the poor plant health state report, so that when the farmland managers see the poor plant health state report, the farmland managers can not only know which plants in the specific orientation are in a poor health state, but also can see the commended poor plant health control strategy, which can provide a more comprehensive reference for agricultural managers.

Both the first plant health state information and the second plant health state information have at least two sources. Each first plant health state information further includes: identification information of the plant health state measuring device 200 (e.g., an ID address of the plant health state measuring device 200) and the geographic coordinate information (latitude and longitude) of the plant health state measuring device 200. Each second plant health state information further includes: identification information of the plant health state measuring device 200, and, of course, the geographic coordinate information of the plant health state measuring device 200.

In an optional embodiment, each of the second plant health state information further includes: identification information of the plant health state measuring device 200. After receiving the first plant health state information provided by the plant health state measuring device 200, before the first determination of the plant health state according to the first plant health state information, the method for monitoring the plant health state further includes the following steps.

In the first step, according to the identification information of the plant health state measuring device 200 and the geographic coordinate information of the plant health state measuring device in each of the first plant health state information, a corresponding relationship between the identification information of the plant health state measuring device and the geographic coordinate information of the plant health state measuring device in each of the first plant health state information is established. And the corresponding relationship between the identification information of the plant health state measuring device and the geographic coordinate information of the plant health state measuring device in each of the first plant health state information is stored.

In the second step, after receiving the second plant health state information provided by the plant health state measuring device 200 in the orientation where the at least one plant at risk of poor health is located, before the second determination of the plant health state according to the second plant health state information, the method for monitoring the plant health state further includes the following steps.

In the third step, according to the corresponding relationship between the identification information of the plant health state measuring device 200 and the geographic coordinate information of the plant health state measuring device 200 in each of the first plant health state information, the identification information of the plant health state measuring device 200 in each of the second plant health state information is identified to obtain the geographic coordinate information of the plant health state measuring device 200 in each of the second plant health state information, so as to determine the source of each of the second plant health state information.

As can be seen from the above description, since the corresponding relationship between the identification information of the plant health state measuring device 200 and the geographic coordinate information of the plant health state measuring device 200 in each of the first plant health state information is established and stored according to the identification information of the plant health state measuring device 200 and the geographic coordinate information of the plant health state measuring device 200 in each of the first plant health state information after receiving the first plant health state information provided by the plant health state measuring device 200, so that when receiving the second plant health state information provided by the plant health state measuring device in the orientation where the at least one plant at risk of poor health is located, it is necessary to receive the identification information of the plant health state measuring device in each of the second plant health state information to find the corresponding geographic coordinate information of the plant health state measuring device according to the established corresponding relationship by using the identification information of the plant health state measuring device in each of the second plant health state information, so as to determine the source of each of the second plant health state information.

In addition, regardless of the generation of a poor plant health state report or a good plant health state report, in addition to containing the plant health state information, the source of the corresponding second plant health state information may be determined, so that the farmland managers can more accurately understand the plant health state according to the source of the second plant health state information, in order to be able to accurately determine the location of the poor plant health when the at least one plant is in poor health.

For example, the operation that a poor plant health state report is generated according to the content indicated by the second determination information and the orientation information of the at least one plant in poor health includes the following steps.

A poor plant health state report is generated according to the content indicated by the second determination information, the orientation information of the at least one plant in poor health, and the source of the second plant health state information of the plant in poor health state.

Another embodiment of the present disclosure also provides an apparatus for monitoring a plant health state. As shown in FIG. 1 and FIG. 6, the apparatus for monitoring the plant health state includes a receiving element 110 and a processing element 120.

The receiving element 110 communicates with a plant health state measuring device 100, and is configured to receive first plant health state information provided by the plant health state measuring device 100.

The processing element 120 connected with the receiving element 110 is configured to perform first determination on the plant health state according to the first plant health state information to obtain first determination information. When the content indicated by the first determination information is a risk of poor plant health, the receiving element 110 is further configured to receive second plant health state information in an orientation where at least one plant at risk of poor plant health is located, and the processing element 120 is further configured to perform second determination on the plant health state according to the second plant health state information to obtain second determination information. And when the content indicated by the second determination information is poor plant health, confirm that the plant health is poor and determine orientation information of the at least one plant in poor health.

Compared with the related art, the beneficial effects of the apparatus for monitoring the plant health state provided by the embodiment of the present disclosure are the same as those of the method for monitoring the plant health state provided by the above embodiment, and will not be described herein.

Illustratively, the first plant health state information includes at least current plant image information, the second plant health state information includes at least current plant image information corresponding to the orientation of the at least one plant at risk of poor health, and when the first plant health state information includes at least the current plant image information, the plant health state measuring device 100 includes an image acquisition element. Specifically, the receiving element 110 communicates with the image acquisition element.

The type of current plant image information contained in the first plant health state information includes at least one of visible spectrum image information and invisible spectrum image information. And the type of current plant image information contained in the second plant health state information includes at least one of visible spectrum image information and invisible spectrum image information.

In addition, the accuracy of the current plant image information in the second plant health state information is greater than the accuracy of the current plant image information in the first plant health state information, so as to achieve the limitation of the receiving and determining times of the plant image information in the foregoing.

Figure 7:
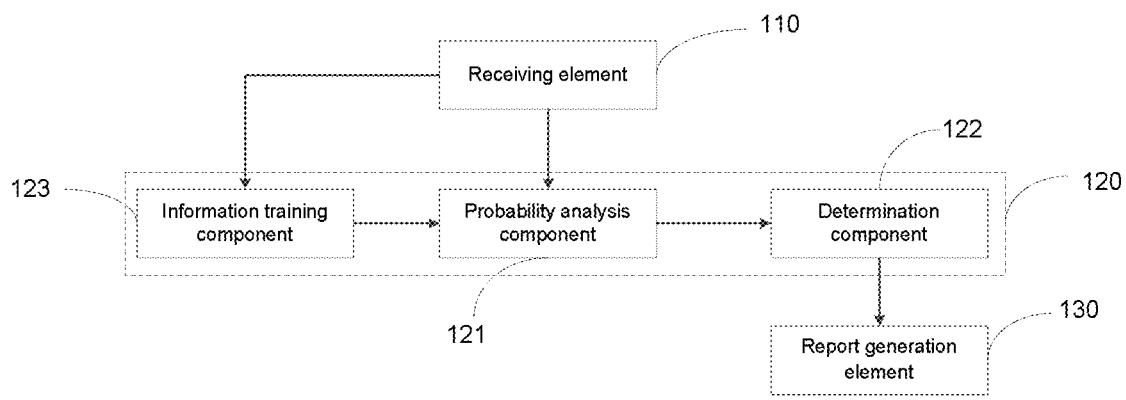
FIG. 7 is a structural block diagram of a processing element according to an embodiment of the present disclosure.

Specifically, as shown in FIG. 7, the processing element 120 includes: a probability analysis component 121, connected with the receiving element 110, and configured to determine the first plant health state information by using a convolutional neural network model to obtain a first poor plant health probability, and determine the second plant health state information by using the convolutional neural network model to obtain a second poor plant health probability; and a determination component 122, respectively connected with the probability analysis component 121 and a report generation element 130, and configured to determine whether the first poor plant health probability is greater than a set threshold. When the first poor plant health probability is greater than the set threshold, the determination component confirms that the at least one plant is at risk of poor health and determine orientation information of the at least one plant at risk of poor health. When the first poor plant health probability is not greater than the set threshold, the determination component determines that the plant is in good health, and determines whether the second poor plant health probability is greater than a set threshold.

When the second poor plant health probability is greater than the set threshold, the determination component confirms that the at least one plant is in poor health and determines the degree of poor plant health and orientation information of the at least one plant in poor health. And when the second poor plant health probability is not greater than the set threshold, the determination component determines that the at least one plant is in good health.

Optionally, the receiving element 110 is further configured to receive historical plant health state information, and the historical plant health state information includes at least historical plant image information.

The processing element 120 further includes an information training component 123 respectively connected with the receiving element 110 and the probability analysis component 121, and configured to learn and train the historical plant health state information by using a convolutional neural network to obtain the convolutional neural network model.

The historical plant health state information further includes at least one of historical soil information, historical air information and historical illumination information. The first plant health state information further includes at least at least one of current soil information, current air information and current illumination information. And the second plant health state information includes at least at least one of current soil information, current air information and current illumination information.

The risk of poor plant health includes at least one of a risk of pest and a risk of nutrient deficiency. The risk of nutrient deficiency includes at least one of a risk of trace element deficiency, a risk of nitrogen deficiency, a risk of phosphorus deficiency, and a risk of potassium deficiency. The poor plant health includes at least one of the at least one plant in a symptom of pest and the at least one plant in a symptom of nutrient deficiency. And the symptom of nutrient deficiency includes at least one of a symptom of trace element deficiency, a symptom of nitrogen deficiency, a symptom of phosphorus deficiency, and a symptom of potassium deficiency.

The first plant health state information further includes at least at least one of current soil information, current air information and current illumination information. The second plant health state information includes at least at least one of current soil information, current air information and current illumination information. And the plant health state measuring device 100 should also include at least one of an air information acquisition element that implements air information measurement, a soil information acquisition element that implements soil information measurement, and an illumination information acquisition element that implements illumination information measurement.

In addition, in order to make the content of the current image information provided by the second plant health state information richer, as shown in FIG. 6, the apparatus for monitoring the plant health state further includes an instruction generation element 160 respectively connected with the processing element 120 and a sending element 150, and configured to generate, when the content indicated by the first determination information is a risk of poor plant health, an image acquisition element control instruction. The image acquisition element control instruction at least includes orientation information of the at least one plant at risk of poor health and image magnification control information. And the image magnification control information includes image magnification factor control information and image magnification angle control information.

The sending element 150 is configured to send the image acquisition element control instruction to the plant health state measuring device, so that the plant health state measuring device acquires, according to the image acquisition element control instruction, the second plant health state information of the orientation where the at least one plant at risk of poor health is located.

Optionally, when the plant health state measuring device 200 is a stationary plant health state measuring device, there are at least m pieces of image magnification factor control information, there are at least n pieces of image magnification angle control information, each of the image magnification angle control information includes device horizontal rotation angle control information and device vertical rotation angle control information, and m and n are both greater than or equal to 1.

The second plant health state information includes m×n groups of plant health state data, and each group of plant health state data includes device rotation angle information, image magnification information, and current plant image information at risk of poor health.

Optionally, when the plant health state measuring device is a movable plant health state measuring device, the image acquisition element control instruction further includes k pieces of device coordinate control information, there are at least m pieces of image magnification factor control information, there are at least n pieces of image magnification angle control information, each of the image magnification angle control information includes device horizontal rotation angle control information and device vertical rotation angle control information, and m, n and k are all greater than or equal to 1.

The second plant health state information includes m×n×k groups of plant health state data, and each group of plant health state data includes device coordinate information, device rotation angle information, image magnification information, and current plant image information at risk of poor health.

In order to enable the farmland managers to fully understand the plant health state, as shown in FIG. 2 and FIG. 6, when the content indicated by at least one of the first determination information and the second determination information is good plant health, the apparatus for monitoring the plant health state further includes a report generation element 130, connected with the processing element 120. The processing element 120 is further configured to determine orientation information of the at least one plant in good health according to the content indicated by at least one of the first determination information and the second determination information.

The report generation element 130 is further configured to periodically generate, when the content indicated by at least one of the first determination information and the second determination information is good plant health, a good plant health state report according to the content indicated by at least one of the first determination information and the second determination information, and the orientation information of the at least one plant in good health.

As shown in FIG. 2 and FIG. 6, the apparatus for monitoring the plant health state further includes a sending element 150, further configured to send the good plant health state report to a client 300. The sending element may send the good plant health state report to the client in a wireless or wire way. In this case, the sending element 150 has a communication relationship with the client 300.

The report generation element 130 is further configured to generate, when the content indicated by the second determination information is poor plant health, a poor plant health state report according to the content indicated by the second determination information and the orientation information of the at least one plant in poor health. And the sending element 150 is further configured to send the poor plant health state report to the client, so that the farmland managers can perform control for the at least one plant in poor health in time.

In addition, an instruction generation element 160 is further configured to generate, when the content indicated by the second determination information is poor plant health, an alarm instruction.

The sending element 150 is further configured to send the alarm instruction to an alarm 400, so that the alarm 400 gives an alarm under the control of the alarm instruction to prompt the farmland managers. At this time, the sending element 150 has a communication relationship with the alarm 400, where when the processing element 120 adopts the structural block diagram shown in FIG. 7, the instruction generation element 160 is connected with the determination component 122.

In addition, the sending element 150 is further configured to send, when the content indicated by the second determination information is poor plant health, a poor plant health state report to the client 300.

In order to make the content of the poor plant health report richer, the apparatus for monitoring the plant health state further includes a crop knowledge database connected with the processing element 120. The crop knowledge database includes various plant information data, and each of the plant information data includes plant information and a corresponding poor plant health control strategy. The processing element 120 is further configured to acquire the plant information data in the crop knowledge database according to the content indicated by the second determination information, and generate a poor plant health control strategy according to the acquired plant information data.

The report generation element 130 is configured to generate a poor plant health state report according to the content indicated by the second determination information, the poor plant health control strategy and the orientation information of the at least one plant in poor health. The poor plant health state report includes not only information on poor plant health but also strategies for how to prevent poor plant health. The poor plant health control strategy includes at least one of a pest control strategy and at least one plant nutrient deficiency control strategy.

It is to be noted that both the first plant health state information and the second plant health state information have at least two sources. At this time, each of the first plant health state information further includes: identification information of the plant health state measuring device and the geographic coordinate information of the plant health state measuring device.

Each of the second plant health state information further includes: identification information of the plant health state measuring device.

At this time, as shown in FIG. 6, the apparatus for monitoring the plant health state further includes: a device identification element 140 connected with the receiving element 110 and the processing element 120, the processing element adopts a structural block diagram as shown in FIG. 7, and the device identification element 140 is connected with the probability analysis component 121.

After receiving first plant health state information provided by the plant health state measuring device 200, and before performing first determination on the plant health state according to the first plant health state information, the device identification element 140 is configured to: establish, according to the identification information of the plant health state measuring device and the geographic coordinate information of the plant health state measuring device in each of the first plant health state information, a corresponding relationship between the identification information of the plant health state measuring device and the geographic coordinate information of the plant health state measuring device in each of the first plant health state information, and store the corresponding relationship between the identification information of the plant health state measuring device and the geographic coordinate information of the plant health state measuring device in each of the first plant health state information.

After receiving second plant health state information provided by the plant health state measuring device in the orientation where the at least one plant at risk of poor health is located, before the second determination of the plant health state according to the second plant health state information, the device identification element 140 is further configured to: identify the identification information of the plant health state measuring device in each of the second plant health state information to obtain the geographic coordinate information of the plant health state measuring device in each of the second plant health state information, so as to determine the source of each of the second plant health state information.

The report generation element 130 is configured to generate a poor plant health state report according to the content indicated by the second determination information, the orientation information of the at least one plant in poor health, and the source of the second plant health state information of the plant in poor health state.

Another embodiment of the present disclosure further provides a storage medium, which is configured to store at least one executable program code that supports the implementation of the method for monitoring the plant health state, and the beneficial effects are the same as the beneficial effects of the method for monitoring the plant health state and will not be described herein.

As shown in FIG. 1 and FIG. 8, another embodiment of the present disclosure further provides a terminal for monitoring the plant health state, which includes a transceiver 501, a memory 502 and a processor 503, where the transceiver 501, the memory 502 and the processor 503 communicate with one another via a bus 504.

The transceiver 501 is configured to communicate with the plant health state measuring device 200, a client 300 and an alarm 400.

The memory 502 is configured to store an executable program code to cause the processor 503 to execute various control instructions to implement the method for monitoring the plant health state.

The processor 503 in the embodiment of the present disclosure may be a processor or a collective name of multiple processing elements. For example, the processor 503 may be a Central Processing Element (CPU), or may be an Application Specific Integrated Circuit (ASIC), or at least one integrated circuit configured to implement the embodiments of the present disclosure, such as at least one Digital Signal Processors (DSP), or at least one Field Programmable Gate Array (FPGA).

The memory 502 may be a storage device or a collective name of multiple storage elements, and is configured to store an executable program code or the like. And the memory 502 may include a Random Access Memory (RAM), and may also include a non-volatile memory such as a magnetic disk memory or a flash memory.

The bus 504 may be an Industry Standard Architecture (ISA) bus, a Peripheral Component (PCI) bus, or an Extended Industry Standard Architecture (EISA) bus. The bus 504 may be divided into an address bus, a data bus, a control bus, and the like. For ease of representation, only one thick line is shown in FIG. 8, but it does not mean that there is one bus or one type of bus.

The various embodiments in the specification are described in a progressive manner, the same or similar parts between the various embodiments may be referred to each other, and each embodiment focuses on the differences from the other embodiments. In particular, for the device embodiment, since it is basically similar to the method embodiment, the description is relatively simple, and the relevant parts can be referred to the description of the method embodiment.

Those skilled in the art can understand that all or part of the processes in the above method embodiments may be implemented by a computer program to instruct related hardware, and the program may be stored in a computer-readable storage medium. When the program is executed, the flow of each method embodiment as described above may be included. The storage medium may be a magnetic disk, an optical disk, a Read-Only Memory (ROM), or a Random Access Memory (RAM).

The above are exemplary implementation manners of the present disclosure, but the scope of protection of the present disclosure is not limited thereto. Any person skilled in the art can easily think of changes or replacements within the technical scope disclosed by the present disclosure, which should be covered by the scope of protection of the present disclosure. Therefore, the scope of protection of the present disclosure should be determined by the scope of protection of the claims.

In the description of the above implementation manner, the specific features, structures, materials, or characteristics described may be combined in a suitable manner in any at least one embodiment or examples.

The above are exemplary implementation manners of the present disclosure, but the scope of protection of the present disclosure is not limited thereto. Any person skilled in the art can easily think of changes or replacements within the technical scope disclosed by the present disclosure, which should be covered by the scope of protection of the present disclosure. Therefore, the scope of protection of the present disclosure should be determined by the scope of protection of the claims.

What is claimed is:

1. A method for monitoring a plant health state, comprising:
   receiving first plant health state information provided by a plant health state measuring device, and determining a plant health state according to the first plant health state information to obtain first determination information;
   when content indicated by the first determination information is a risk of poor plant health, receiving second plant health state information in an orientation where at least one plant at risk of poor plant health is located, and determining the plant health state according to the second plant health state information to obtain second determination information; and
   when content indicated by the second determination information is poor plant health, confirming that the plant health state is poor, and determining orientation information of the at least one plant in poor health.

2. The method for monitoring the plant health state as claimed in claim 1, wherein the first plant health state information at least comprises current plant image information; and
   determining a plant health state according to the first plant health state information to obtain first determination information comprises:
   determining the first plant health state information by using a convolutional neural network model to obtain a first poor plant health probability;
   determining whether the first poor plant health probability is greater than a set threshold; and
   when the first poor plant health probability is greater than the set threshold, confirming that the at least one plant is at risk of poor health and determining the orientation information of the at least one plant at risk of poor health.

3. The method for monitoring the plant health state as claimed in claim 2, wherein before determining the first plant health state information by using a convolutional neural network model, the method further comprises:
   receiving historical plant health state information, the historical plant health state information at least comprising historical plant image information; and
   learning and training the historical plant health state information by using a convolutional neural network to obtain the convolutional neural network model.

4. The method for monitoring the plant health state as claimed in claim 3, wherein the historical plant health state information further comprises at least one of historical soil information, historical air information and historical illumination information;
   the first plant health state information further comprises at least at least one of current soil information, current air information and current illumination information; and
   the second plant health state information comprises at least at least one of current soil information, current air information and current illumination information.

5. The method for monitoring the plant health state as claimed in claim 2, wherein a type of current plant image information contained in the first plant health state information comprises at least one of visible spectrum image information and invisible spectrum image information.

6. The method for monitoring the plant health state as claimed in claim 2, wherein when the content indicated by the first determination information is the risk of poor plant health, before receiving second plant health state information in the orientation where the at least one plant at risk of poor plant health is located, the method further comprises:
   generating an image acquisition element control instruction, the image acquisition element control instruction at least comprising orientation information of the at least one plant at risk of poor health and image magnification control information, and the image magnification control information comprising image magnification factor control information and image magnification angle control information; and
   sending the image acquisition element control instruction to the plant health state measuring device, so that the plant health state measuring device acquires, according to the image acquisition element control instruction, the second plant health state information of the orientation where the at least one plant at risk of poor health is located.

7. The method for monitoring the plant health state as claimed in claim 6, wherein when the plant health state measuring device is a stationary plant health state measuring device, there are at least m pieces of image magnification factor control information, there are at least n pieces of image magnification angle control information, each of the image magnification angle control information comprises device horizontal rotation angle control information and device vertical rotation angle control information, and m and n are both greater than or equal to 1; and
   the second plant health state information comprises m×n groups of plant health state data, and each group of plant health state data comprises device rotation angle information, image magnification information, and current plant image information at risk of poor health.

8. The method for monitoring the plant health state as claimed in claim 6, wherein when the plant health state measuring device is a movable plant health state measuring device, the image acquisition element control instruction further comprises k pieces of device coordinate control information;
  there are at least m pieces of image magnification factor control information, there are at least n pieces of image magnification angle control information, each of the image magnification angle control information comprises device horizontal rotation angle control information and device vertical rotation angle control information, and m, n and k are all greater than or equal to 1; and
  the second plant health state information comprises m×n×k groups of plant health state data, and each group of plant health state data comprises device coordinate information, device rotation angle information, image magnification information, and current plant image information at risk of poor health.

9. The method for monitoring the plant health state as claimed in claim 1, wherein the second plant health state information at least comprises current plant image information corresponding to the orientation where the at least one plant at risk of poor health is located; and
  determining the plant health state according to the second plant health state information to obtain the second determination information comprises:
  determining the second plant health state information by using a convolutional neural network model to obtain a second poor plant health probability;
  determining whether the second poor plant health probability is greater than a set threshold; and
  when the second poor plant health probability is greater than the set threshold, confirming that the at least one plant is in poor health, and determining the degree of poor plant health and orientation information of the at least one plant in poor health.

10. The method for monitoring the plant health state as claimed in claim 9, wherein a type of current plant image information contained in the second plant health state information comprises at least one of visible spectrum image information and invisible spectrum image information.

11. The method for monitoring the plant health state as claimed in claim 1, wherein the risk of poor plant health comprises at least one of a risk of pest and a risk of nutrient deficiency, and the risk of nutrient deficiency comprises at least one of a risk of trace element deficiency, a risk of nitrogen deficiency, a risk of phosphorus deficiency, and a risk of potassium deficiency; and
  the poor plant health comprises at least one of the at least one plant in a symptom of pest and the at least one plant in a symptom of nutrient deficiency, and the symptom of nutrient deficiency comprises at least one of a symptom of trace element deficiency, a symptom of nitrogen deficiency, a symptom of phosphorus deficiency, and a symptom of potassium deficiency.

12. The method for monitoring the plant health state as claimed in claim 1, wherein when the content indicated by at least one of the first determination information and the second determination information is good plant health, the method further comprises:
  determining, according to the content indicated by at least one of the first determination information and the second determination information, the orientation where the at least one plant in good health is located; and
  periodically generating a good plant health state report according to the content indicated by the at least one of the first determination information and the second determination information and the orientation information of the at least one plant in good health, and sending the good plant health state report to a client.

13. The method for monitoring the plant health state as claimed in claim 1, wherein after confirming that the plant health state is poor and determining the orientation information of the at least one plant in poor health, the method further comprises:
  generating a poor plant health state report according to the content indicated by the second determination information and the orientation information of the at least one plant in poor health;
  sending the poor plant health state report to the client; and
  generating an alarm instruction, and sending the alarm instruction to an alarm, so that the alarm gives an alarm according to the alarm instruction.

14. The method for monitoring the plant health state as claimed in claim 13, wherein generating the poor plant health state report according to the content indicated by the second determination information and the orientation information of the at least one plant in poor health comprises:
  acquiring plant information data from a crop knowledge database according to the content indicated by the second determination information, and generating a poor plant health control strategy according to the acquired plant information data, the crop knowledge database comprising a plurality of plant information data, each of the plant information data comprising plant information and a corresponding poor plant health control strategy; and
  generating the poor plant health state report according to the content indicated by the second determination information, the poor plant health control strategy and the orientation information of the at least one plant in poor health.

15. The method for monitoring the plant health state as claimed in claim 14, wherein the poor plant health control strategy comprises at least one of a pest control strategy and a plant nutrient deficiency control strategy.

16. An apparatus for monitoring a plant health state, comprising:
  a receiving element, configured to receive first plant health state information provided by a plant health state measuring device; and
  a processing element, connected with the receiving element, and configured to perform first determination on a plant health state according to the first plant health state information to obtain first determination information;
  the receiving element is further configured to receive, when content indicated by the first determination information is a risk of poor plant health, second plant health state information in an orientation where at least one plant at risk of poor plant health is located;
  the processing element is further configured to perform second determination on the plant health state according to the second plant health state information to obtain second determination information, and when the content indicated by the second determination information is poor plant health, confirm that the plant health state is poor and determine orientation information of the at least one plant in poor health.

17. The apparatus for monitoring the plant health state as claimed in claim 16, wherein the processing element is further configured to determine, when the content indicated by at least one of the first determination information and the second determination information is good plant health, the orientation where the at least one plant in good health is located according to the content indicated by at least one of the first determination information and the second determination information;

the apparatus further comprises:

a report generation element, connected with the processing element, and configured to periodically generate, when the content indicated by at least one of the first determination information and the second determination information is good plant health, a good plant health state report according to the content indicated by at least one of the first determination information and the second determination information and the orientation information of the at least one plant in good health; and the apparatus further comprises:

a sending element, connected with the report generation element, and configured to send the good plant health state report to a client.

18. The apparatus for monitoring the plant health state as claimed in claim 17, wherein the report generation element is further configured to generate, when the content indicated by the second determination information is poor plant health, a poor plant health state report according to the content indicated by the second determination information and the orientation information of the at least one plant in poor health;

the sending element is further configured to send the poor plant health state report to the client;

the apparatus further comprises:

an instruction generation element, respectively connected with the processing element and the sending element, and configured to generate, when the content indicated by the second determination information is poor plant health, an alarm instruction; and the sending element is further configured to send the alarm instruction to an alarm, so that the alarm gives an alarm according to the alarm instruction.

19. The apparatus for monitoring the plant health state as claimed in claim 16, wherein the risk of poor plant health comprises at least one of a risk of pest and a risk of nutrient deficiency, and the risk of nutrient deficiency comprises at least one of a risk of trace element deficiency, a risk of nitrogen deficiency, a risk of phosphorus deficiency, and a risk of potassium deficiency; and the poor plant health comprises at least one of the at least one plant in a symptom of pest and the at least one plant in a symptom of nutrient deficiency, and the symptom of nutrient deficiency comprises at least one of a symptom of trace element deficiency, a symptom of nitrogen deficiency, a symptom of phosphorus deficiency, and a symptom of potassium deficiency.

20. The apparatus for monitoring the plant health state as claimed in claim 16, wherein the first plant health state information at least comprises current plant image information, the second plant health state information comprises at least current plant image information corresponding to the orientation where the at least one plant at risk of poor health is located; and the processing element comprises:

a probability analysis component, connected with the receiving element, and configured to determine the first plant health state information by using a convolutional neural network model to obtain a first poor plant health probability, and determine the second plant health state information by using the convolutional neural network model to obtain a second poor plant health probability; and a determination component, respectively connected with the probability analysis component and a report generation element, and configured to determine whether the first poor plant health probability is greater than a set threshold, when the first poor plant health probability is greater than the set threshold, confirm that the at least one plant is at risk of poor health and determine orientation information of the at least one plant at risk of poor health, and determine whether the second poor plant health probability is greater than a set threshold, and when the second poor plant health probability is greater than the set threshold, confirm that the at least one plant is in poor health and determine the degree of poor plant health and orientation information of the at least one plant in poor health.

* * * * *